Patented Jan. 22, 1924.

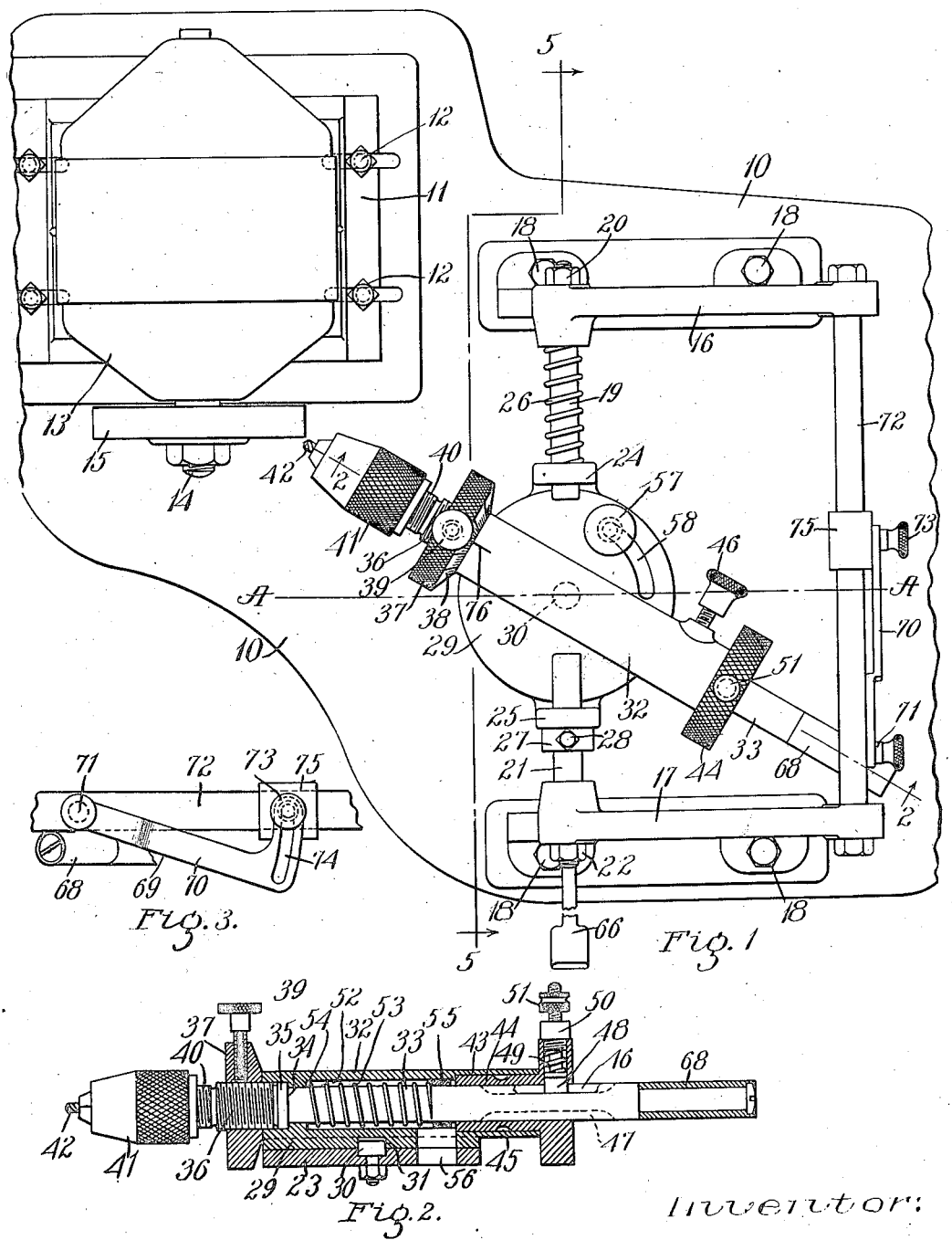

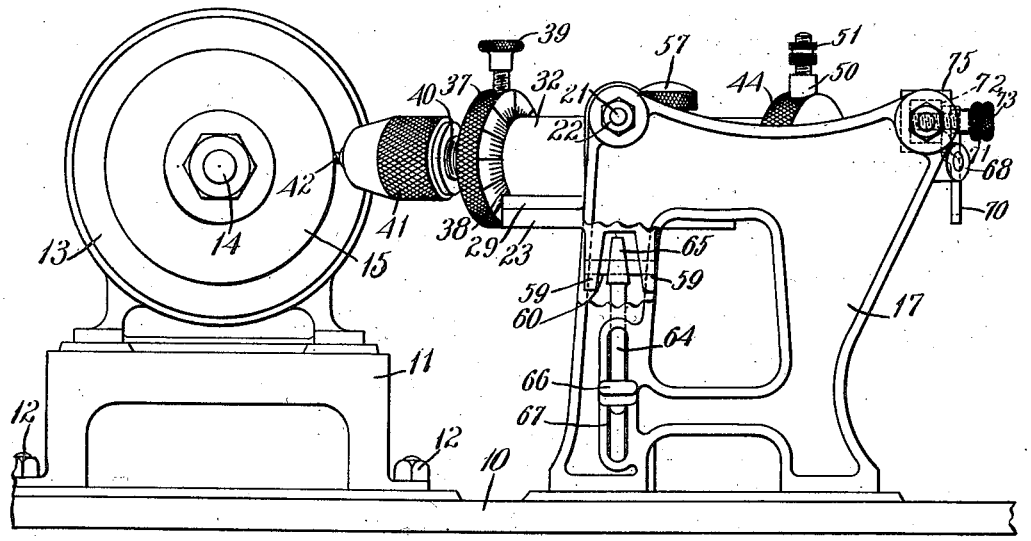

1,481,260

UNITED STATES PATENT OFFICE.

GEORGE HEMENWAY, OF FITCHBURG, MASSACHUSETTS.

APPARATUS FOR POSITIONING AND GRINDING TWIST DRILLS.

Application filed October 14, 1922. Serial No. 594,465.

*To all whom it may concern:*

Be it known that I, GEORGE HEMENWAY, a citizen of the United States, residing at Fitchburg, in the county of Worcester and State of Massachusetts, have invented new and useful Improvements in Apparatus for Positioning and Grinding Twist Drills, of which the following is a specification.

This invention relates to an apparatus for positioning and grinding twist drills.

The object of the invention is to provide an apparatus in which a twist drill may be supported and positioned in a manner to present the cutting edges thereof into engagement with the face of a grinding wheel in order that said cutting edges may be ground at the correct angle to the longitudinal median line of said drill.

Another object of the invention is to provide a manually operated means for moving the drill supporting instrumentalities to feed the drill into engagement with the grinding wheel, together with means for returning said supporting instrumentalities to their initial position.

Another object of the invention is to provide means for rocking the drill supporting instrumentalities in a vertical plane while the drill is still in engagement with the grinding wheel in such a manner that the faces of the drill adjacent to the cutting edges thereof will be "backed off" in order to afford clearance for the cutting edges.

Still another object of the invention is to provide means whereby after one of the cutting edges of the drill has been presented to the grinding instrumentalities the holding instrumentalities for said drill may be rotated through an angle of 180° to correctly position said drill to grind the other cutting edge thereof.

The invention consists in the combination and arrangement of parts whereby the above objects and certain other objects hereinafter appearing may be attained as set forth in the following specification and particularly pointed out in the claims thereof.

Referring to the drawings:

Figure 1 represents a plan view of an apparatus for positioning and grinding twist drills embodying the invention.

Fig. 2 is a detail vertical section taken on the line 2—2 of Fig. 1.

Fig. 3 is a detail side elevation of the cam for rocking the drill supporting instrumentalities.

Fig. 4 is a front elevation of the apparatus.

Fig. 5 is a section taken on the line 5—5 of Fig. 1, but illustrating in elevation the drill supporting instrumentalities.

Like numerals refer to like parts throughout the several views of the drawings.

In the drawings, 10 represents a base plate, on which a platform 11 is adjustably secured through the medium of bolts 12. An electric motor 13 is mounted upon the platform 11 and the driving shaft 14 of said motor has a grinding wheel 15 of any suitable type rigidly secured thereto in any desired manner. The motor 13 and grinding wheel 15 driven thereby constitute the grinding instrumentalities and form a unit which is entirely independent of the work supporting and feeding instrumentalities hereinafter to be described, but are adjustable relatively thereto through the medium of the bolts 12.

A pair of side frames 16 and 17 are rigidly fastened to the base plate 10 by bolts or screws 18 and said frames are positioned in parallel relation to each other. A stud 19 is rigidly fastened at one end thereof to the side frame 16 by a nut 20 and said stud projects inwardly from said frame toward the frame 17. Another stud 21 is rigidly fastened at one end thereof to the side frame 17 by a nut 22 and said last-named stud also projects inwardly from said last-named frame toward the stud 19. The median longitudinal lines of the studs 19 and 21 are coincident and said studs constitute supports for a table 23 which is provided with oppositely disposed lugs 24 and 25 projecting upwardly therefrom which are both slidably and pivotally mounted upon the studs 19 and 21 respectively. A spring 26 surrounds the stud 19 between the frame 16 and the lug 24 and said spring always acts to force the table 23 toward its normal position as illustrated in Fig. 1, at which time the lug 25 contacts with a collar 27 adjustably mounted upon the stud 21 and fastened thereto by a set screw 28.

Mounted upon the slidable table 23 is an auxiliary table 29. The tables 23 and 29 are each approximately circular in form and a center stud 30 is rigidly fastened in the table 23 in any suitable manner at the central point thereof and said stud projects upwardly into a recess 31 provided in the table 29 and provides a bearing member around which the table 29 may oscillate while resting upon the upper surface of the table 23. The table 29 has a portion 32 formed integral therewith and projecting upwardly therefrom which constitutes a bearing for a chuck spindle 33, the longitudinal median line of which is positioned a trifle higher than the longitudinal median line of the motor shaft 14 and grinding wheel 15. The spindle 33 is shouldered at 34 thereby forming a slightly enlarged portion 35 which is screw threaded at 36 to receive a nut 37 constituting a micrometer and which is provided with suitable graduations 38 on the face thereof adjacent to the end surface of the bearing 32. A binding screw 39 is provided for the micrometer 37, said screw engaging the screw-threaded portios 36 of the spindle 33. The spindle 33 is also provided with another screw-threaded portion 40 upon which a chuck 41 of any desired construction is mounted, said chuck being adapted to tightly grip and hold a twist drill 42 in a manner well known to those skilled in the art.

Located at the opposite end of the bearing 32 from the micrometer 37 and projecting into a recess 43 provided therefor in said bearing is a sleeve 44 which is provided with a groove 45 extending therearound to receive the extremity of a thumb screw 46 provided for the purpose of holding the sleeve 44 within the recess 43, but also permitting the rotation of said sleeve within said recess when it is so desired. The spindle 33 is provided with oppositely disposed grooves 46 and 47 formed therein to receive the extremity of a plunger 48 which is held in either one or the other of said grooves to prevent said spindle 33 from rotating by a spring 49, one extremity of which bears against a shouldered portion of said plunger and the other extremity bears against the extremity of an auxiliary sleeve 50 which is secured in the sleeve 44. The plunger 48 is raised and manipulated through the medium of a thumb nut 51 which has screw-threaded engagement with the upper portion of said plunger. Surrounding the spindle 33 within an extension 52 of the recess 43 is a spring 53, one extremity of which bears against a shoulder 54 at the inner extremity of said extension and the other extremity of said spring bears against a collar 55 fast to said spindle and adjustable thereon. Access is had to the collar 55 to adjust the same through an opening 56 extending through the tables 23 and 29 as illustrated in Fig. 2.

The normal position of the drill supporting instrumentalities is as illustrated in Fig. 1, at which time the longitudinal median line of the spindle 33 and drill 42 is correctly positioned relatively to the face of the grinding wheel 15 to correctly grind the cutting edges of the drill and the drill supporting instrumentalities are securely held in this position through the medium of a clamping screw 57 which projects through a slot 58 provided in the auxiliary table 29 and has screw-threaded engagement with the table 23. When it is desired to insert the drill 42 into the chuck 41 or to remove a drill therefrom the clamping screw 57 is loosened and the table 29, together with the various parts mounted thereon, are moved to position the longitudinal median line of the chuck spindle 33 approximately upon the line A—A in Fig. 1, and after a drill has been placed in the chuck 41 and the latter manipulated to grip said drill therein, the table 29 is returned to its normal position, at which time the clamping screw 57 contacting with the end portion of the slot 58 constitutes a stop to correctly position the angle of the longitudinal median line of said drill 42 with relation to the face of the grinding wheel 15.

The means for moving the drill supporting instrumentalities to feed the drill into engagement with the grinding wheel 15 are as follows: Formed integral with the table 23 and projecting downwardly therefrom are a pair of lugs 59 between which extends a pin 60. Pivotally mounted at 61 upon a bracket 62 fast to the base plate 10 is a bell crank lever 63, an arm 64 of which is provided with a forked extremity 65 adapted to engage the pin 60 previously mentioned. Another arm 66 of the bell crank lever 63 projects through an opening 67 provided in the side frame 17 and constitutes a handle through the medium of which the operative manually rocks the lever 63 and moves the drill supporting instrumentalities upon the studs 19 and 21 a sufficient distance for the drill 42 to be brought into contact with the face of the grinding wheel 15.

In order that the end faces of the drill adjacent to the cutting edges thereof may be "backed off" to afford clearance for said cutting edges, means are provided for rocking the drill supporting instrumentalities in a vertical plane upon the studs 19 and 21 while the end of the drill is in engagement with the grinding wheel, said means being as follows:—Rotatably mounted upon a shouldered portion provided upon the chuck spindle 33 at the opposite end thereof from the drill 42 is a roller 68 and the latter during the forward movement of the drill supporting instrumentalities contacts with an inclined edge 69 of a cam 70 which is pivotally mounted at 71 upon a bar 72 which extends between the side frames 16 and 17. The cam 70 is adjusted to vary the inclination of the surface 69 through the medium of a clamping screw 73 which projects through a slot 74 formed in said cam and into a block 75 which is slidably mounted upon the bar 72.

The general operation of the apparatus is as follows:—Assuming that the various parts are positioned as illustrated in Fig. 1, in order to insert a drill 42 into the chuck 41 the clamping screw 57 is manipulated to loosen the table 29 upon the table 23, and the former is then moved upon the latter until the longitudinal median line of the chuck spindle 33 is located approximately in a position indicated by the line A—A in Fig. 1, at which time the drill may be inserted into the chuck 41 without interference from the grinding instrumentalities, said drill being held within said chuck in the usual well known manner. The table 29 is then returned to its normal position, at which time the end of the slot 58 will contact with the screw 57 which is then tightened to securely clamp the tables 29 and 23 together. The longitudinal median line of the chuck spindle 33 and drill 42 is now correctly positioned relatively to the face of the grinding wheel 15 to grind one of the cutting edges of said drill at the correct angle to said median line. It is next necessary to adjust the chuck spindle and drill longitudinally thereof to correctly position the end faces of the drill relatively to the face of the grinding wheel so that when the drill supporting instrumentalities are moved forwardly the drill will contact with said wheel. This is accomplished by rotating the micrometer 37 in the proper direction to move the chuck spindle 33 longitudinally thereof either toward or away from the face of the grinding wheel as may be required, the spring 53 always acting to hold the micrometer 37 against the adjacent end of the bearing 32 as said micrometer is rotated. The amount of movement imparted to the chuck spindle may be determined by observing the graduations 38 upon the micrometer 37 in relation to a mark 76 provided upon the upper face of the bearing 32 adjacent to said micrometer. After the drill is properly positioned, the arm 66 of the bell crank lever 63 is grasped and said bell crank lever is operated to move the drill supporting instrumentalities forwardly until the drill is brought in engagement with the grinding wheel and during the forward movement of the drill supporting instrumentalities and while the drill is still in engagement with said grinding wheel, the roller 68 at the outer end of the chuck spindle 33 engages the inclined edge 69 of the cam 70 thereby rocking the drill supporting instrumentalities in a vertical plane a sufficient distance to "back off" the face of the drill adjacent to the cutting edge. The drill supporting instrumentalities are then returned to their initial position through the medium of the spring 26. One cutting edge now having been ground, it is necessary to rotate the chuck spindle 33 through an arc of 180° in order to position the other cutting edge of the drill in order that it may also be ground. The plunger 48 is therefore lifted out of the groove 46 in the spindle 33 by grasping the thumb nut 51 and pulling the latter upwardly and after the plunger has been entirely removed from the groove 46, the spindle is rotated until the groove 47 is brought into alignment with the plunger 48 which will immediately spring into said groove and thereafter securely hold the spindle. The feeding operation is then repeated and the second cutting edge of the drill is ground as previously described. If it is desired to use a grinding wheel of a different diameter than that illustrated the position of the motor 15 is adjusted by loosening the screws 12 and moving said motor toward or away from the drill supporting instrumentalities as required.

I claim:

1. An apparatus of the character described comprising, in combination, a grinding wheel, means to rotate said grinding wheel, means to hold a drill, means to support said holding means to position the longitudinal median line of said drill at a predetermined angle to the face of said grinding wheel, means to adjust said holding means to position a cutting edge of said drill relatively to the face of said grinding wheel, said holding means also being adapted to be rotated to position another cutting edge of said drill relatively to said grinding wheel and means to move said drill supporting means to feed said drill into engagement with said grinding wheel.

2. An apparatus of the character described comprising, in combination, a grinding wheel, means to rotate said grinding wheel, means to hold a drill, means to support said holding means to position the longitudinal median line of said drill at a predetermined angle to the face of said grinding wheel, means to adjust said holding means to position a cutting edge of said drill relatively to the face of said grinding wheel, said holding means also being adapted to be rotated to position another cutting edge of said drill relatively to said grinding wheel, means to lock said holding means to prevent the rotation thereof and means to move said drill supporting means to feed said drill into engagement with said grinding wheel.

3. An apparatus of the character described comprising, in combination, a grinding wheel, means to rotate said grinding wheel, means to hold a drill, means to support said holding means to position the longitudinal median line of said drill at a predetermined angle to the face of said grinding wheel, means to adjust said holding means to position a cutting edge of said drill relatively to the face of said grinding wheel, said holding means also being adapted to be rotated to position another cutting edge of said drill relatively to said grinding wheel, means to lock said holding means to prevent the rotation thereof, means to move said drill supporting means to feed said drill into engagement with said grinding wheel, means to rock said supporting means in a vertical plane while said drill is in engagement with said grinding wheel and means to automatically return said supporting means to its initial position.

4. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be rotated in said auxiliary table, a chuck fast to said spindle and adapted to hold a drill therein and means to move said first-named table to feed said drill into engagement with said grinding wheel.

5. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be rotated in said auxiliary table, a chuck fast to said spindle and adapted to hold a drill therein, means to adjust said spindle longitudinally thereof within said auxiliary table to position a cutting edge of said drill relatively to the face of said grinding wheel and means to move said first-named table to feed said drill into engagement with said grinding wheel.

6. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be rotated in said auxiliary table, a chuck fast to said spindle and adapted to hold a drill therein, means to adjust said spindle longitudinally thereof within said auxiliary table to position a cutting edge of said drill relatively to the face of said grinding wheel, means to lock said spindle against rotation in said auxiliary table and means to move said first-named table to feed said drill into engagement with said grinding wheel.

7. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be manually rotated in said auxiliary table, a chuck fast to said spindle and adapted to hold a drill therein, means to adjust said spindle longitudinally thereof within said auxiliary table to position a cutting edge of said drill relatively to the face of said grinding wheel, means to lock said spindle against rotation in said auxiliary table, means to move said first-named table to feed said drill into engagement with said grinding wheel and means to rock said spindle while said drill is in engagement with said grinding wheel.

8. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be manually rotated in said auxiliary table, a chuck fast to said spindle and adapted to hold a drill therein, means to adjust said spindle longitudinally thereof within said auxiliary table to position a cutting edge of said drill relatively to the face of said grinding wheel, means to lock said spindle against rotation in said auxiliary table, means to move said first-named table to feed said drill into engagement with said grinding wheel, a cam and a roller mounted upon said spindle and engaging said cam during the feeding movement of said first named table to rock said spindle while said drill is in engagement with said grinding wheel.

9. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be manually rotated in said auxiliary table, a chuck fast to said spindle and adapted to hold a drill therein, means to adjust said spindle longitudinally thereof within said auxiliary table to position a cutting edge of said drill relatively to the face of said grinding wheel, means to lock said spindle against rotation in said auxiliary table, means to move said first-named table to feed said drill into engagement with said grinding wheel, a cam, a roller mounted upon said spindle and engaging said cam during the feeding movement of said first-named table to rock said spindle while said drill is in engagement with said grinding wheel and means to adjust the position of said cam and thereby vary the rocking movement of said spindle.

10. An apparatus of the character described comprising, in combination, a grinding wheel, means to rotate said grinding wheel, a pair of side frames, a table pivotally mounted upon said side frames, an auxiliary table mounted upon said pivoted table, means to clamp said tables together, a spindle mounted to be manually rotated in said auxiliary table, a chuck fast to said spindle and adapted to hold a drill therein, means to adjust said spindle longitudinally thereof within said auxiliary table to position a cutting edge of said drill relatively to the face of said grinding wheel, means to lock said spindle against rotation in said auxiliary table, means to move said first-named table to feed said drill into engagement with said grinding wheel, a cam, a roller mounted upon said spindle and engaging said cam during the feeding movement of said first-named table to rock said spindle while said drill is in engagement with said grinding wheel, means to adjust the position of said cam and thereby vary the rocking movement of said spindle and means to return said first-named table to its initial position.

In testimony whereof I have hereunto set my hand in presence of two subscribing witnesses.

GEORGE HEMENWAY.

Witnesses:
JAMES H. McGRATH,
JOHN C. FITZGERALD.